United States Patent [19]
Beasley

[11] Patent Number: 5,914,571
[45] Date of Patent: Jun. 22, 1999

[54] METHOD FOR IGNITING HIGH FREQUENCY OPERATED, HIGH INTENSITY DISCHARGE LAMPS

[75] Inventor: Denny D. Beasley, Fairfield, Ohio

[73] Assignee: Delta Power Supply, Inc., Cincinnati, Ohio

[21] Appl. No.: 08/921,686

[22] Filed: Sep. 2, 1997

Related U.S. Application Data

[XX .
[60] Provisional application No. 60/025,364, Sep. 3, 1996.

[51] Int. Cl.⁶ ................................................. H05B 37/00
[52] U.S. Cl. ................... 315/244; 315/276; 315/209 R; 315/307; 315/DIG. 7
[58] Field of Search ............................ 315/244, 209 R, 315/254, 266, 276, 291, 224, 307, DIG. 7

[56] References Cited

U.S. PATENT DOCUMENTS

| | | | |
|---|---|---|---|
| 3,573,544 | 4/1971 | Zonis | 315/206 |
| 4,724,362 | 2/1988 | Lester | 315/289 |
| 4,888,528 | 12/1989 | Byszewski et al. | 315/344 |
| 4,958,107 | 9/1990 | Mattas et al. | 315/289 |
| 5,225,742 | 7/1993 | Beasley | 315/307 |
| 5,534,753 | 7/1996 | Blom et al. | 315/244 |
| 5,796,216 | 8/1998 | Beasley | 315/307 |

*Primary Examiner*—Don Wong
*Assistant Examiner*—Haissa Philogene
*Attorney, Agent, or Firm*—Porter, Wright Morris & Arthur

[57] ABSTRACT

The present invention describes a method and circuitry for igniting high frequency operated, high intensity discharge lamps by means of a dual resonant circuit driven by a nonsinusoidal waveform; typically a square wave in the preferred embodiment. A capacitor in series with the lamp is selected to resonate at the fundamental frequency of the applied waveform when the lamp is in the on condition, providing thereby the high frequency power to the lamp for its normal operation. A capacitor in parallel with the lamp is chosen to resonate at a higher harmonic of the applied frequency, typically the third harmonic, when the lamp is in the off condition. Hysteresis heating causes the ignition voltage of the lamp to decrease as higher frequency power is applied, leading to ignition of the lamp at the third harmonic without applying to the lamp one or more pulses of high voltage. An alternative embodiment of the present invention uses dc offset circuitry to apply dc voltage to the lamp at typically an integral multiple of the peak value of the alternating applied voltage.

10 Claims, 5 Drawing Sheets ered by first building an energy reserve in a capacitor of $\frac{1}{2}CV^2$ when capacitor having capacitance "C" is charged to
METHOD FOR IGNITING HIGH FREQUENCY OPERATED, HIGH INTENSITY DISCHARGE LAMPS

RELATED APPLICATIONS

This application is based upon provisional patent application Ser. No. 60/025,364 filed Sep. 3, 1996 in pursuant to 35 U.S.C. § 111 (b), having the same title, inventor and common subject matter with the present application, and the present application claims right of priority therefrom pursuant to 35 U.S.C. § 119 (e).

FIELD OF INVENTION

This invention relates to the general field of high intensity discharge ("HID") lamps operated by means of high frequency applied power. More particularly, the present invention relates to methods and circuits for igniting high frequency operated HID lamps.

BACKGROUND OF INVENTION

High intensity discharge ("HID") lamps such as sodium, metal halide, mercury and others are commonly used sources of illumination due to their relatively high efficiencies in converting electrical input power into light output. It is well known that the efficiency of HID lamps is generally improved by operating such lamps with high frequency electrical input power to drive the discharge within the lamp. However, the ignition of such HID lamps brings certain associated problems due to the highly dynamic characteristics of operation of HID lamps which change from an effective open circuit when extinguished to a very low impedance (close to zero) in an extremely brief time upon ignition. Ballast circuits are required to provide electrical power to the lamp causing it to ignite and to operate efficiently following ignition. High efficiency ballast circuits have typically been quite expensive in the prior art. Ballasts delivering high voltage pulses to the lamp causing it to ignite also have the undesirable side effect of deteriorating the electrodes of the HID lamp since, under the influence of the high applied voltage, the removal of material from the electrodes is facilitated. The electrode material is generally deposited onto the interior surfaces of the lamp, leading to darkening of the lamp as well as destruction of the electrodes by such loss of material. These effects shorten the useful life of the HID lamp. A method for igniting high frequency operated HID lamps without the use of high applied voltages, which thereby avoids harmful effects on the HID lamp from the high voltage, is the subject of the present invention.

There are several methods of igniting HID lamps in the prior art. U.S. Pat. Nos. 4,724,362, 4,958,107 and 5,534,753 all use a pulse technique of ignition, applying a high voltage pulse to the lamp for the purpose of causing ionization, discharge and ignition. This ignition pulse is typically generated by first building an energy reserve in a capacitor of $\frac{1}{2}CV^2$ when capacitor having capacitance "C" is charged to a voltage "V," which is then connected to a self triggered device, such as a SIDAC or other high power switching device. When the voltage attains the device's trigger level, the SIDAC self-triggers to an "on" condition. The energy stored in the capacitor is then dumped into an inductive device, inducing an undamped ringing condition (such as U.S. Pat. No. 4,724,362) or dumped into the secondary of a transformer that up converts the energy to a high voltage pulse in order to achieve ignition of the lamp (such as U.S. Pat. Nos. 5,534,753 and 4,958,107). All of these patents generate a pulse of high voltage which carries the attendant drawbacks noted above and is avoided by the ignition method and circuitry of the present invention.

U.S. Pat. No. 4,888,528 describes a separate high frequency, high voltage oscillator (number 32 in the referenced patent) that is used to superimpose the very high frequency over whatever waveshape is otherwise applied to the lamp from the ballast (denoted by 21 in this patent). The two different frequencies, the usual lamp driving frequency and the superimposed high frequency, are segregated by inductors denoted by 27 and 28. The present invention does not require a separate high frequency generator, thus distinguishing from the invention disclosed in this patent. The present invention in one embodiment may superimpose a high frequency applied voltage onto a dc offset voltage, but does not require a separate generator for either the dc or the high frequency ac, making use of the inherent characteristics of the lamp for this purpose. Other embodiments of the present invention do not use dc, applying only ac to the lamp.

In U.S. Pat. No. 3,573,544, a secondary resonance point is used when the lamp is not ignited and capacitor (30 in this patent) resonates at the higher frequency. By increasing frequency during no load (that is, lamp extinguished), and utilizing resonate rise of voltage of a high Q circuit increases the voltage to the ignition point for that frequency, ignites the gas in the arc tube. Unlike the present invention which ignites the HID lamp at relatively low voltages, this patent uses a high voltage with a high frequency in its starting phase. The present invention is different because there is no intervention in oscillator frequency and there need not be DC offset set up on the series connected resonant capacitive element.

The method of igniting the lamp of the present invention should be distinguished from conventional ballast of the prior art. In much of the prior art, a very high voltage narrow spike is typically used to ionize the gas. The amount of energy in that very high voltage narrow spike determines how much total material gets ionized. The ionized materials have a certain latency interval which is the longest time the lamp can be unenergized and then powered again with normal voltage and still be in a conductive state. If the off time is longer than this period, the material becomes non-ionized (neutral) again and the lamp will require a cool down period to restart. If you ionize the gas material and then immediately use the main power source and sustain that arc, then the lamp will be in operation.

High voltage pulses tend to damage the electrodes in the arc tube of HID lamps. When the lamp is off, the gas is cold and the electrodes are in non-thermionic emission, which means that in order to lift an electron off the surface of the electrodes, a sufficiently strong E field must be supplied against the work function of the surface in order to lift and remove that electron. The surface of the electrode has a very strong work function, so it requires the dissipation of a lot of energy. The electrodes are typically symmetrical with sharp edges. All of the energy deposited from the typical storage capacitor, ($\frac{1}{2}CV^2$) is directed towards lifting the electrons off of the electrodes and some neutral matter is also lifted off of the electrodes as well, which results in darkening or blackening around the electrode. Thus, every time a high voltage pulse is applied to the electrode of the lamp, not only electrons are removed from the electrode but other material is removed from the electrode as well. The blackening caused by material removed from electrodes also increase the opacity of a part of the arc tube which means that the light output of the lamp goes down over time. The present invention overcomes these problems in the prior art.

In addition to high voltage pulses, FIG. 1 describes qualitatively another method for igniting HID lamps. FIG. 1 illustrates the known characteristic of discharge gases that higher applied frequency will cause ignition at lower applied voltages. The effect of "hysteresis heating" is commonly presumed to cause the effect illustrated in FIG. 1 of lower ignition voltages being required at higher applied frequencies.

The hysteresis heating effect illustrated in FIG. 1 has been used in the prior art, typically in the form of a special high frequency generator constructed as part of the lamp circuit. When it is detected that the lamp is out, the high frequency generator is activated resulting in ignition of the lamp pursuant to the hysteresis heating effect of FIG. 1 This approach to ignition has the disadvantages of requiring a separate high frequency generator, and associated logic to detect when the lamp is out so the high frequency can be activated. These additional components add to the complexity and cost of the lamp ballast.

In summary, the prior art methods for igniting high intensity discharge lamps involve the application of one or more high voltage pulses, the generation and application to the lamp of high frequency, or a combination of both.

The present invention makes use of the hysteresis heating effect of FIG. 1 in combination with circuitry causing high frequencies to be applied to the lamp without the need for separate, auxiliary generation of this high frequency. The method and circuitry of the present invention automatically shifts operation to higher frequencies when the lamp is out, without the need for separate logic circuits to detect the off condition of the lamp. High voltage spikes are not required to ignite the lamp pursuant to the present invention, thus avoiding the loss of material from the electrodes, blackening of the tube, and resulting shortened lamp life. The present invention thus achieves simplified and lower cost operation of HID lamps.

SUMMARY OF INVENTION

The present invention achieves ignition of high frequency operated, high intensity, discharge lamps by applying ignition power at higher frequencies than that utilized in the operation of the lamp. A square wave is typically applied to the primary of a transformer comprising, in the secondary circuit thereof, the output circuit containing the lamp. When the lamp is in the "on" condition, resonance in the output circuit is achieved by selecting inductance and capacitance in series with the lamp resonating at typically the primary (lowest order harmonic) frequency contained in the applied square wave. Capacitance is connected in parallel with the lamp such that, when the lamp is in the "out" condition presenting effectively an open circuit to current passing through the lamp, the resultant circuit resonates at a higher harmonic, typically the third harmonic, of the applied square wave. DC offset circuits may optionally be included in the output circuit to enhance ignition.

An advantage of the present invention is to provide ignition for a high frequency operated, high intensity discharge lamp without application of a high voltage pulse, or other form of increased voltage being applied to the lamp.

Another advantage of the present invention is to provide ignition for a high frequency operated, high intensity discharge lamp without special high frequency generators providing high frequency power to the lamp through the output circuit.

Yet another advantage of the present invention is to provide ignition for a high frequency operated, high intensity discharge lamp without using logic or special detection circuits to detect when the lamp is in the "out" condition.

Yet another advantage of the present invention is to provide ignition for a high frequency operated, high intensity discharge lamp by means of applied high frequency maintained to the lamp for a period as long as necessary to achieve ignition.

Another advantage of the present invention is to provide ignition for a high frequency operated, high intensity discharge lamp including dc offset circuitry to enhance ignition.

DESCRIPTION OF PREFERRED EMBODIMENTS

Figure 1:
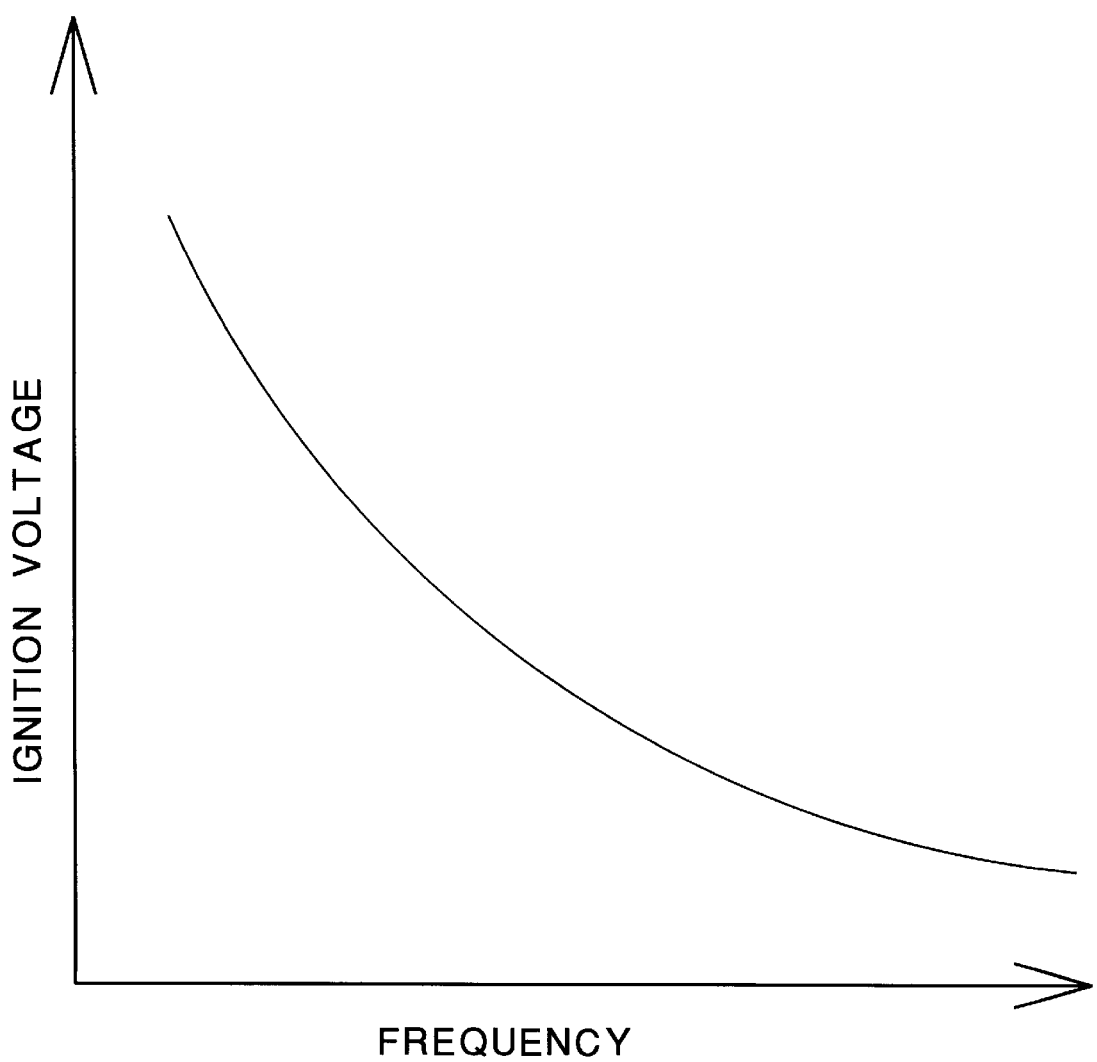
FIG. 1: Qualitative representation of the decrease in ignition voltage of high intensity discharge lamps with the application of increasing frequency.

The present invention is a method for igniting high frequency operated, high intensity discharge lamps utilizing the special characteristics of gas plasmas at high frequencies as schematically depicted in FIG. 1. The special hysteresis heating characteristics of gasses at high frequency permit ignition at lower voltages and much lower energy impulse to initiate conduction while the electrodes are in a non-thermionic mode. This extends lamp life by reducing or eliminating electrode erosion.

Figure 2:
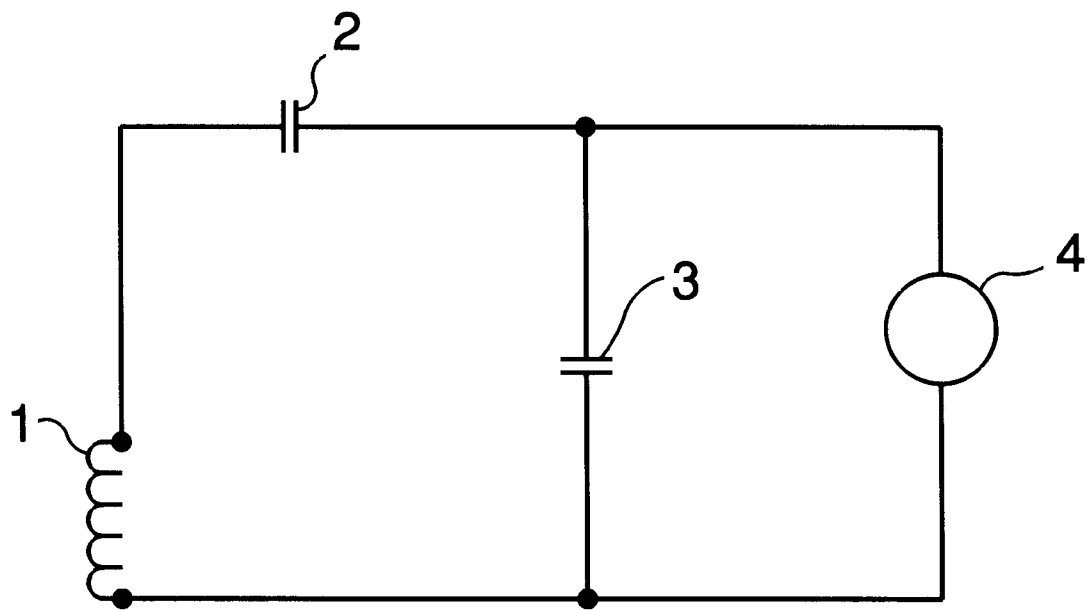
FIG. 2: Dual resonant circuit of the present invention.

FIG. 2 shows one embodiment of an equivalent circuit of the lamp output of the present invention for the present method of igniting high frequency operated HID lamps. FIG. 2 shows an inductor, 1, having inductance L in series with the HID lamp, 4. typically, inductor 1 will be the secondary winding of a transformer. The power to operate the lamp is applied to the primary of this transformer (not shown in FIG. 2), and the secondary, 1, will provide the power to operate the lamp. In the preferred embodiment, the power supplied to 1 will be a high frequency square wave. Square waves can be resolved into their harmonic (Fourier) components by standard techniques of harmonic analysis. This shows that the square wave contains only odd harmonic components, that is first harmonic, third harmonic, fifth harmonic and so on. It is also a standard result from harmonic analysis that the relative intensity of electrical power appearing in each harmonic is proportional to the order of the harmonic. Thus, the third harmonic carries one-third the power of the first harmonic. The fifth harmonic carries one-fifth the power of the first harmonic, and so forth.

In normal operation with the lamp, 4, ignited, the lamp will typically have very low resistance. Typical HID lamps, when on, present a resistive load of very low magnitude resistance to the rest of the circuit. Therefore, when on, lamp, 4, effectively short-circuits the capacitor, 3, eliminating its effect on the characteristics of the lamp output circuit depicted in FIG. 2. Capacitor, 2, in FIG. 2 is selected to have a value $C_1$ such that resonance occurs at the first (primary) harmonic of the square wave applied to inductor 1. That is, if the primary harmonic has angular frequency ω, $C_1$ is chosen according to Equation 1.

$$C_1 = 1/(L\omega^2).\qquad\text{Eq. 1}$$

While Equation 1 gives the resonant frequency for ideal circuit components it might not be precisely correct in actual circuits due to inherent variation in nominal values of L and $C_1$; due to small non-resistive contributions to the circuit by lamp, 4; by residual effects of capacitor 3 even though approximately short-circuited by lamp, 4, when on; by stray non-resistive contributions to the circuit of FIG. 2 from various other circuit components and configurations. Nevertheless, the present invention chooses the capacitative value of series capacitor, 2, to be substantially in resonance with the primary harmonic of the applied power when lamp, 4, is on.

When the lamp is off, it closely approximates an open circuit, effectively removing its effect on the electrical characteristics of FIG. 2. In this off condition, capacitors 2, and 3 in series with inductance 1 comprise another resonant circuit. The value of the capacitance of capacitor 2 ($C_1$) was chosen to resonate with the primary harmonic of the applied power (typically square wave) when the lamp is on. The value of capacitance of capacitor 3 ($C_2$) is chosen such that the resultant circuit of lamp off, inductor 1, capacitors 2, and 3 in series, will be in substantial resonance with a higher harmonic of the applied power waveform. If nω denotes a higher harmonic angular frequency of primary harmonic ω, resonance will occur at approximately the value of $C_2$ given by Equation 2.

$$C_2 = C_1/(Ln^2\omega^2 C_1 - 1)\qquad\text{Eq. 2}$$

where n≠1

Imperfections in the circuit as described above will make Equation 2 less than precise. However, the essential approach of the present invention is clear: choose $C_1$ to cause the output circuit containing the lamp to resonate at the primary harmonic of the applied power when the lamp is on: choose $C_2$ to cause the output circuit containing the lamp to resonate at a higher harmonic of the applied power when the lamp is off. By this means the circuit of FIG. 2 provides primary harmonic driving power to operate the lamp when the lamp is on. The circuit of FIG. 2 automatically and without special sensing or intervention will provide higher frequency power to ignite the lamp whenever the lamp is off. Thus, the circuit of FIG. 2 in combination with the lower ignition voltage necessary for ignition depicted in FIG. 1 leads to effective ignition of HID lamps.

In the practice of the present invention, it is found preferable to apply a square wave to inductor 1. A square wave contains sufficient power in higher harmonics for proper functioning of the present invention, without losing excessive amounts of energy by the harmonic filtering effected by the circuit of FIG. 2. Circuit components tend to have increased losses at higher frequencies. Thus, in the practice of the present invention ignition with the third harmonic of an applied square wave proves to be a favorable balance. In normal lamp-on operation, the circuit of FIG. 2 is configured apply substantially the first harmonic of the driving square wave to the lamp, 4. Thus, although the power applied to inductor 1 is a square wave, the resonant nature of the circuit of FIG. 2 applies essentially sinusoidal power waveforms to lamp, 4. In the lamp-off condition, the circuit of FIG. 2 is chosen, by means of the choice of capacitor, 3, to resonate at the third harmonic, noting that a square wave contains only odd harmonic components.

The use of a square wave to supply the driving power is preferred in the practice of the present invention but not essentially required. Another waveform will suffice such that it has sufficient power in higher harmonics to ignite the lamp at the higher harmonic frequency applied to the lamp during the ignition process (including the dc offset voltage applied to the lamp, if any).

It should be noted that the present invention applies the high frequency power to the lamp for as long as necessary to achieve ignition. This is in contrast to prior art techniques in which pulses of high voltage are applied or the ignition phase of the lamp is otherwise limited in time by a capacitor dump or other transient effect. For time-limited approaches to ignition in the prior art, it becomes important to have sufficient power to insure ignition. In contrast, the present invention will remain in the ignition mode (typically applying third harmonic frequency to the lamp) for as long as necessary to achieve ignition. Thus, less stress is placed on the electrical components by sudden dumping of electrical energy.

Instead of igniting the lamp by means of a high voltage peak (the peak of the prior art may be about 1 kV to 5 kV), the present invention uses a very high frequency and a lower ignition voltage. By igniting the lamp at high frequencies and at relatively low voltages, the ignition process accelerates any available free charges in gas in the lamp, which basically gives it hysteresis heating and ionization. This accelerates any free ionized material that is in the gas and causes collisions and heating. Ignition voltage for HID lamps following the present invention can be as low as 200 volts at an operating harmonic frequency of 70 kHz (tripled to 210 KHz for ignition following the present invention). This is approximately an order of magnitude below conventional ignition in the prior art. The lower ignition voltage helps prevent damage of the electrodes.

The peak applied ignition voltage of the present invention is not applied in the form of a sharp pulse as in the prior art, but is applied over a long duration which is favorable for ignition. Since the frequency is very high, this causes hysteresis heating in the gas. A typical underlying sine wave for the operation of 400 watt halide lamps may range anywhere from between 90 kHz and 400 kHz depending on the power at which the user wants to operate the lamp. Following the present invention, these frequencies will be tripled for ignition. Another example is a 70 watt lamp that may operate at frequency of about 250 kHz to about 1.2 MHz., tripled for ignition. Use of high frequency also enables the lamp to operate well beyond the latency of the gas in the lamp. If gas is ionized and then let sit for a certain period of time, it will collapse and become non-ionized and the lamp cannot be reignited for a period of time.

For conventional ballasts, the ignition voltage will become extremely high and then begin to reduce as time goes by (as the gas cools down). The voltage will spike up and drop down when the lamp re-ignites, and look kind of like a square wave. This re-ignition pulse happens on every half cycle, which has a negative impact on the arc tube because you have a glow to arc condition where it has to go through a glow phase and then go into full conduction. In the glow phase, materials are removed from the arc stream.

The present invention operates at a high frequency that is beyond the latency interval of the gas. This occurs around 5 kHz for most gasses. The present invention operates at a much higher frequency so the plasma in the lamp is in a conductive state every time the lamp is ignited. Thus, the present invention has no glow to phase condition, so, the present invention eliminates another one of the mechanisms that destroys electrodes.

Figure 3:
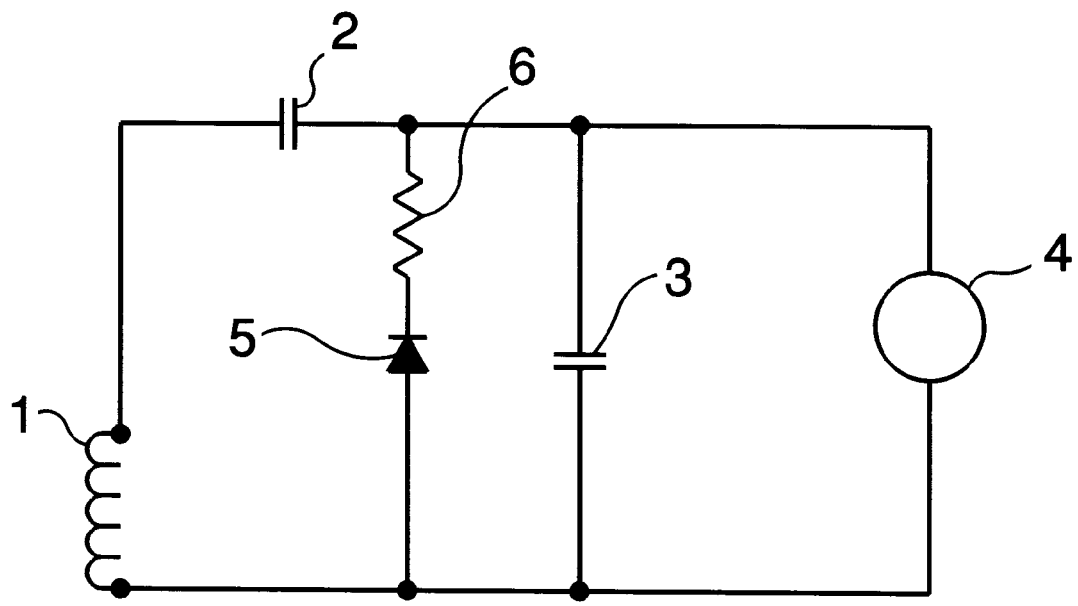
FIG. 3: Dual resonant circuit of the present invention including dc offset voltage.

Another embodiment of the present invention makes use of dc offset circuits to increase the applied voltage to the lamp for ignition. The dc offset circuit adds a reasonably constant dc voltage to the high frequency voltage applied to the lamp for ignition. One embodiment of the dc offset voltage is shown in FIG. 3 in which a diode, 5, in series with a resistor, 6, rectifies the harmonic waveform and applies the peak value of the voltage to capacitor, 3. Thus, capacitor 3 (in addition to causing the circuit to resonate at a higher harmonic of the applied waveform), also stores energy to be released in dc form during subsequent half cycles. The effect of the circuit in FIG. 3 to ignite the lamp by applying an ac voltage at the resonant frequency of the circuit containing inductance, 1, and capacitors 2 and 3, added to the dc offset at the peak frequency of the applied voltage.

Figure 4:
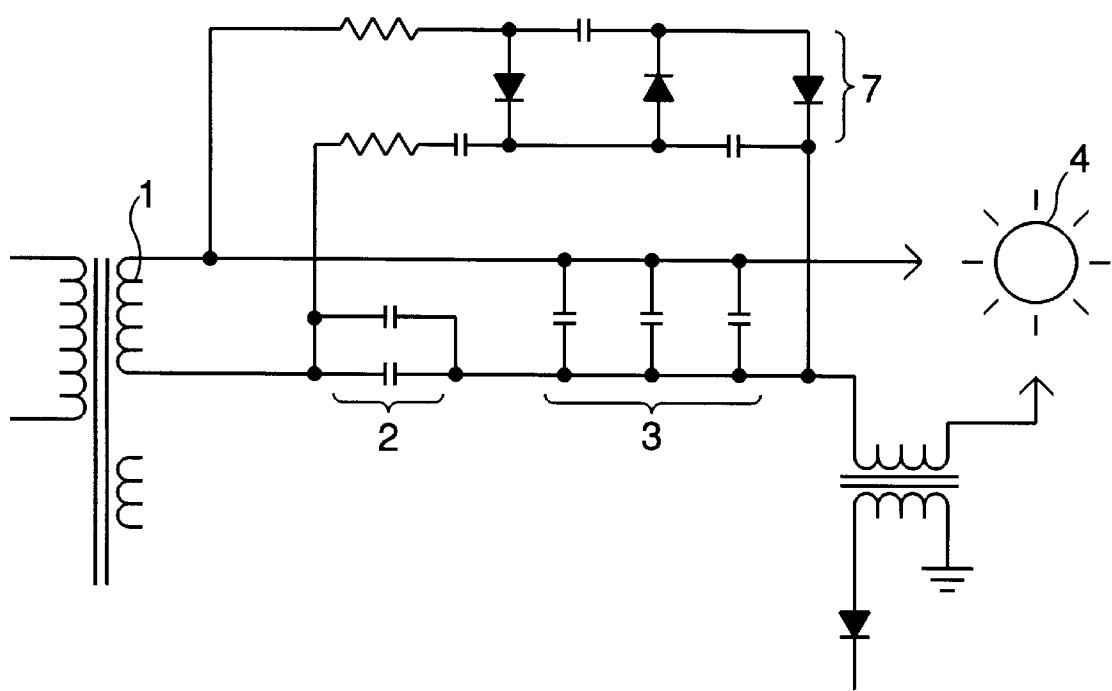
FIG. 4: Dual resonant circuit of the present invention including dc offset voltage at twice the peak voltage of the applied ac voltage.
Figure 5:
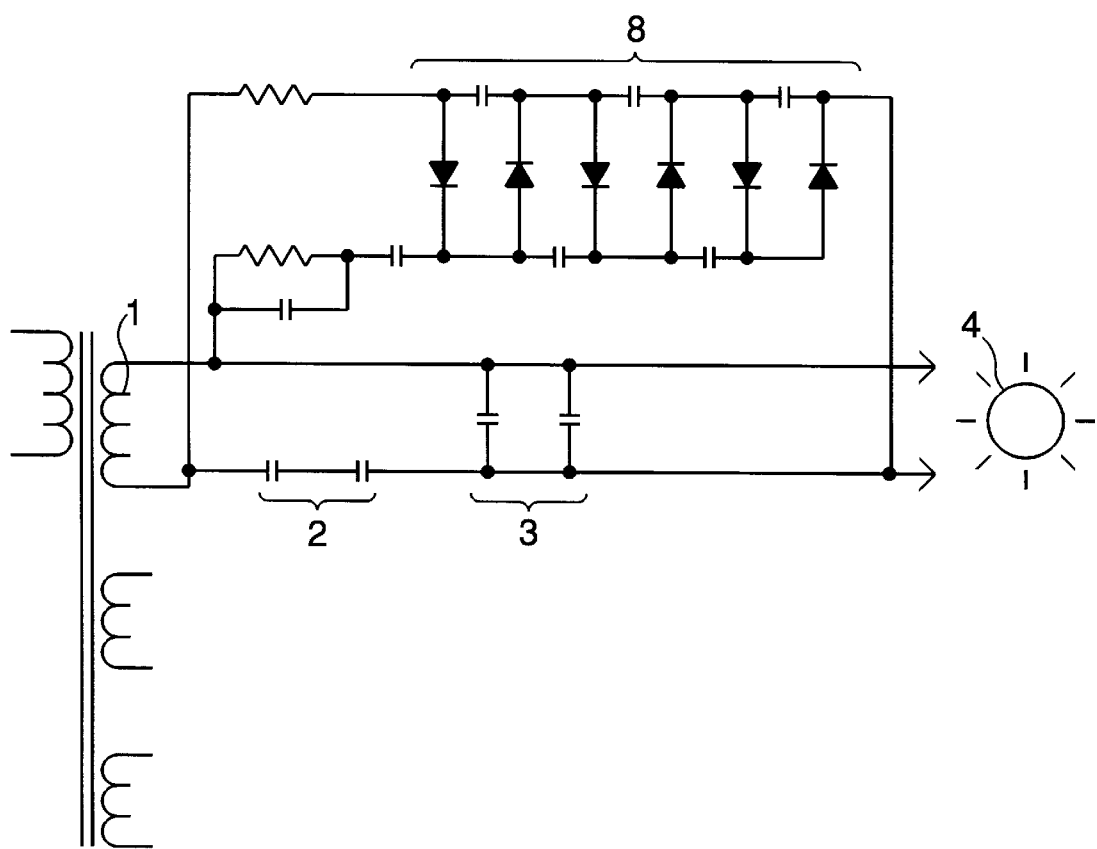
FIG. 5: Dual resonant circuit of the present invention including dc offset voltage at five times the peak voltage of the applied ac voltage.

This is possible to use dc offsets at twice, three times, etc. the value of the peak applied voltage by use of suitable voltage multiplier circuits. FIG. 4 shows a voltage double circuit, 7, resulting in the application of a dc offset voltage twice the peak applied value in addition to the ac voltage applied by the resonant circuit. FIG. 5 shows a dc offset voltage at five times the peak ac applied voltage, 8.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

I claim:

1. A method for igniting a high frequency operated, high intensity discharge lamp having an on condition and an off condition, said method comprising the step of applying nonsinusoidal high frequency power to an output circuit comprising the lamp to be ignited, a first capacitance, a second capacitance and an inductance, said lamp, first capacitance and inductance being connected in series and said second capacitance being connected in parallel with said lamp and in series with said inductance and said first capacitance, wherein a virtual subcircuit comprising said inductance, said lamp and said first capacitance is substantially in resonance with the lowest harmonic component of said high frequency power when the lamp is in the on condition, and wherein the output circuit comprising said inductance, said lamp, said first capacitance and said second capacitance is substantially in resonance with a higher harmonic component of said high frequency power when the lamp is in the off condition.

2. A method as in claim 1 wherein said high frequency power is applied as a square wave to the primary of a transformer and wherein said inductance in series connection with said lamp is the secondary of said transformer.

3. A method as in claim 2 wherein said output circuit is substantially in resonance with the third harmonic component of said square wave.

4. A method as in claim 1 further comprising applying a dc offset voltage to said lamp, thereby enhancing ignition.

5. A method as in claim 4 wherein said dc offset voltage is an integral multiple of the voltage of the nonsinusoidal high frequency power applied to said lamp.

6. An output circuit for igniting a high frequency operated, high intensity discharge lamp having an on condition and an off condition, said output circuit comprising the lamp to be ignited, a first capacitance, a second capacitance and an inductance, said lamp, first capacitance and inductance being connected in series and said second capacitance being in parallel connection with said lamp and in series connection with said inductance and said first capacitance, wherein a virtual subcircuit comprising said inductance, said lamp and said first capacitance is substantially in resonance with the lowest harmonic component of nonsinusoidal high frequency power applied to the output circuit when the lamp is in the on condition, and wherein said output circuit comprising said inductance, said lamp, said first capacitance and said second capacitance is substantially in resonance with a higher harmonic component of said high frequency power when the lamp is in the off condition.

7. A circuit as in claim 6 wherein said high frequency power is a square wave applied to the primary of a transformer and wherein said inductance in series with said lamp is the secondary of said transformer.

8. A circuit as in claim 7 wherein said output circuit is substantially in resonance with the third harmonic component of said square wave.

9. A circuit as in claim 6 further comprising in said output circuit, circuitry for generating dc offset voltage for application to said lamp, thereby enhancing ignition.

10. A circuit as in claim 9 wherein said circuitry generating dc offset voltage generates dc offset voltage that is an integral multiple of the voltage of the nonsinusoidal high frequency power applied to said lamp.

* * * * *